United States Patent
Soroker et al.

(10) Patent No.: US 8,219,991 B2
(45) Date of Patent: Jul. 10, 2012

(54) CONSOLIDATED LAUNCHING OF MULTIPLE TASKS

(75) Inventors: Danny Soroker, Larchmont, NY (US); Daniel Irimie Dig, Champaign, IL (US); Ramon Caceres, New York, NY (US); Sébastien Demathieu, Paris (FR); Apratim Purakayastha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 12/115,661

(22) Filed: May 6, 2008

(65) Prior Publication Data

US 2008/0250410 A1    Oct. 9, 2008

Related U.S. Application Data

(63) Continuation of application No. 11/450,618, filed on Jun. 9, 2006, now abandoned.

(51) Int. Cl.
*G06F 9/46* (2006.01)
*G06F 9/44* (2006.01)

(52) U.S. Cl. ......... 718/100; 717/100; 717/101; 717/120

(58) Field of Classification Search ................. 718/100; 717/100, 101, 120
See application file for complete search history.

(56) References Cited

U.S. PATENT DOCUMENTS

| | | | |
|---|---|---|---|
| 5,361,357 A | 11/1994 | Kionka | |
| 5,485,615 A | 1/1996 | Wennmyr | |
| 5,574,898 A | 11/1996 | Leblang et al. | |
| 5,854,932 A | 12/1998 | Mariani et al. | |
| 6,195,659 B1 | 2/2001 | Hyatt | |
| 6,263,492 B1 | 7/2001 | Fraley et al. | |
| 6,292,933 B1* | 9/2001 | Bahrs et al. ................. | 717/107 |
| 6,546,395 B1 | 4/2003 | DeKimpe et al. | |
| 6,665,678 B2 | 12/2003 | Ching Chen et al. | |
| 6,678,716 B1 | 1/2004 | Pronsati, Jr. et al. | |

(Continued)

FOREIGN PATENT DOCUMENTS

WO    2004092978 A2    10/2004

OTHER PUBLICATIONS

USPTO Notice of allowance for U.S. Appl. No. 11/453,515 dated Sep. 1, 2010.

(Continued)

*Primary Examiner* — Van Nguyen
(74) *Attorney, Agent, or Firm* — Yee & Associates, P.C.; William Stock

(57) ABSTRACT

Consolidating the launching of multiple tasks is provided. A task is launched when an associated software component is run or executed. In one embodiment, launch descriptions of individual tasks and composition parameters are respectively read. The parameters indicate relationships between the launchings of different tasks, such as launch order. A composite launch description is constructed, by selectively processing the individual launch descriptions and composition parameters, and the tasks are launched according to the composite launch description. In a further embodiment, multiple individual launch descriptions are delivered to a tool, each launch description being usable to launch a corresponding component to perform a corresponding task. The tool includes a set of launch relationships that specify the relationship between launchings of different components. The tool generates a single composite launch description that defines launching of the components in accordance with the launch relationships.

17 Claims, 5 Drawing Sheets

U.S. PATENT DOCUMENTS

| | | | |
|---|---|---|---|
| 6,678,889 B1 * | 1/2004 | Burkett et al. | 718/104 |
| 6,782,508 B1 * | 8/2004 | Bahrs et al. | 715/210 |
| 6,789,251 B1 | 9/2004 | Johnson | |
| 6,804,682 B1 | 10/2004 | Kemper et al. | |
| 6,938,240 B2 | 8/2005 | Charisius et al. | |
| 6,950,990 B2 * | 9/2005 | Rajarajan et al. | 715/736 |
| 6,966,061 B1 | 11/2005 | Vance et al. | |
| 7,051,036 B2 * | 5/2006 | Rosnow et al. | 707/723 |
| 7,055,130 B2 | 5/2006 | Charisius et al. | |
| 7,080,081 B2 | 7/2006 | Agarwal et al. | |
| 7,127,707 B1 | 10/2006 | Mishra et al. | |
| 7,152,224 B1 | 12/2006 | Kaler et al. | |
| 7,236,974 B2 | 6/2007 | Bhattacharjee et al. | |
| 7,251,655 B2 | 7/2007 | Kaler et al. | |
| 7,272,818 B2 | 9/2007 | Ishimitsu et al. | |
| 7,328,206 B2 | 2/2008 | Petculescu et al. | |
| 7,370,315 B1 | 5/2008 | Lovell et al. | |
| 7,383,320 B1 | 6/2008 | Silberstein et al. | |
| 7,461,049 B2 | 12/2008 | Thompson et al. | |
| 7,487,436 B2 | 2/2009 | Aureglia et al. | |
| 7,631,014 B2 | 12/2009 | Bhattacharjee et al. | |
| 7,707,566 B2 | 4/2010 | Grover et al. | |
| 7,765,211 B2 | 7/2010 | Bhattacharjee et al. | |
| 7,797,293 B2 | 9/2010 | Pabla et al. | |
| 7,844,570 B2 | 11/2010 | Netz et al. | |
| 7,870,536 B2 | 1/2011 | Banavar et al. | |
| 7,971,198 B2 | 6/2011 | Almeida | |
| 8,037,056 B2 | 10/2011 | Naicken et al. | |
| 8,069,437 B2 | 11/2011 | Aigner et al. | |
| 2002/0087561 A1 | 7/2002 | Ching Chen et al. | |
| 2003/0195898 A1 | 10/2003 | Agarwal et al. | |
| 2004/0031015 A1 | 2/2004 | Ben-Romdhane et al. | |
| 2004/0060036 A1 | 3/2004 | Natori et al. | |
| 2004/0205066 A1 | 10/2004 | Bhattacharjee et al. | |
| 2004/0216090 A1 | 10/2004 | Kaler et al. | |
| 2004/0220972 A1 | 11/2004 | Bhattacharjee et al. | |
| 2005/0005261 A1 | 1/2005 | Severin | |
| 2005/0034098 A1 | 2/2005 | DeSchryver et al. | |
| 2005/0278709 A1 | 12/2005 | Sridhar et al. | |
| 2005/0289180 A1 * | 12/2005 | Pabla et al. | 707/104.1 |
| 2006/0020619 A1 | 1/2006 | Netz et al. | |
| 2006/0190503 A1 | 8/2006 | Naicken et al. | |
| 2006/0206496 A1 | 9/2006 | Aureglia et al. | |
| 2006/0218538 A1 | 9/2006 | van Kesteren | |
| 2006/0282837 A1 | 12/2006 | Almeida | |
| 2007/0094607 A1 | 4/2007 | Morgan et al. | |
| 2007/0255772 A1 | 11/2007 | Bhattacharjee et al. | |
| 2007/0288883 A1 | 12/2007 | Soroker et al. | |
| 2007/0294667 A1 | 12/2007 | Caceres et al. | |
| 2007/0294701 A1 | 12/2007 | Banavar et al. | |
| 2008/0263511 A1 | 10/2008 | Shapiro | |

OTHER PUBLICATIONS

USPTO office action for U.S. Appl. No. 12/125,717 dated Sep. 9, 2010.

Chen et al., "Distributed Dynamic Scheduling of Composite Tasks on Grid Computing Systems", 2002 IEEE, pp. 88-97.

Gensel et al., "Integrating Constraints, Composite Objects and Tasks in a Knowledge Representation System", 1993, IEEE, pp. 127-130.

USPTO Notice of allowance for U.S. Appl. No. 11/450,618 dated Oct. 27, 2009.

Padmanabhan et al., "Multi-Dimensional Clustering: A New Data Layout Scheme in DB2"; ACM, SIGMOD 2003, Jun. 2003 San Diego, CA, pp. 637-641.

USPTO office action for U.S. Appl. No. 11/453,492 dated Jun. 15, 2010.

Randell et al., "Visual Studio 2005: Bridge the Gap Between Development and Operations with Whitehorse", msdn magazine, pp. 1-9, retrieved Apr. 19, 2006. http://msdn.microsoft.com/msdnmag/issies/04/07/Whitehorse.

Williams, "An Overview of Microsoft's Whitehorse", Mar. 23, 2--4, retrieved Apr. 19, 2006, http://www.developer.com/net/cplus/print/php/3329641.

"Rational Application Developer for WebSphere Software—Comprehensive Eclipse-based rapid application development for software developers", IBM, pp. 1-2, retrieved Apr. 19, 2006, http://www.ibm.com/software/awktools/developer/application.

Eclipse website, retrieved Apr. 19, 2006, http://www.eclipse.com.

Beck, "D44 Table Partitioning Fundamentals", IBM Corporation 2005, DB2 Information Management Technical Conference, Orlando Florida, Sep. 2005, pp. 1-43.

USPTO Notice of allowance for U.S. Appl. No. 12/125,717 dated Apr. 15, 2011.

USPTO non-final office action dated dated Jun. 15, 2010 regarding U.S. Appl. No. 11/453,492, 17 Pages.

USPTO final office action dated Nov. 9, 2010 regarding U.S. Appl. No. 11/453,492, 16 Pages.

USPTO final office action dated Jul. 26, 2011 regarding U.S. Appl. No. 11/453,492, 18 Pages.

USPTO non-final office action dated dated Feb. 17, 2011 regarding U.S. Appl. No. 11/453,492, 13 Pages.

USPTO final office action dated Feb. 23, 2009 regarding U.S. Appl. No. 11/412,554, 9 Pages.

USPTO non-final office action dated Aug. 5, 2008 regarding U.S. Appl. No. 11/412,554, 10 Pages.

USPTO notice of allowance dated Jul. 29, 2009 regarding U.S. Appl. No. 11/412,554, 8 Pages.

Preliminary amendment dated Mar. 31, 2008 regarding U.S. Appl. No. 11/450,618, 3 Pages.

USPTO non-final office action dated Jan. 6, 2012 regarding U.S. Appl. No. 12/114,842, 32 Pages.

* cited by examiner

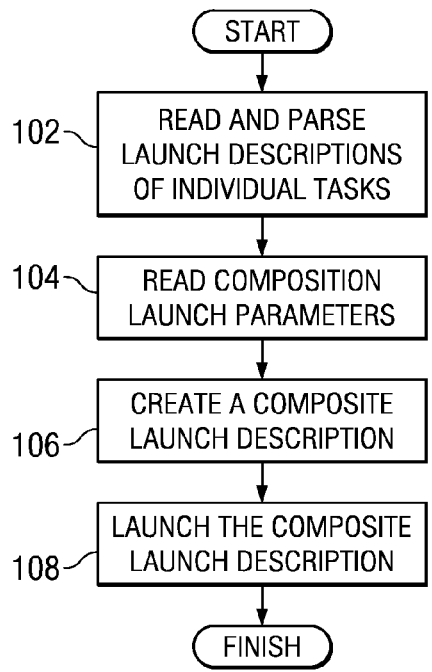
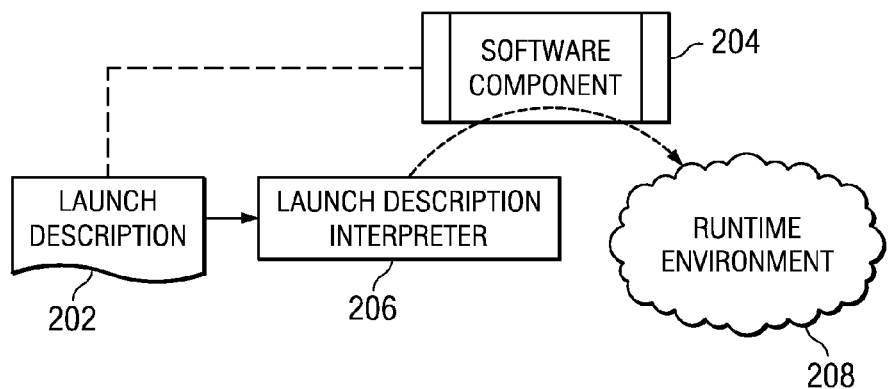
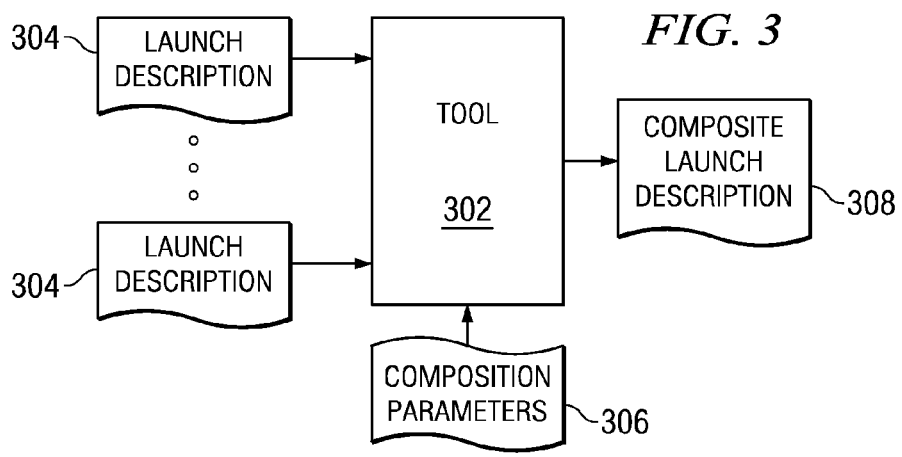

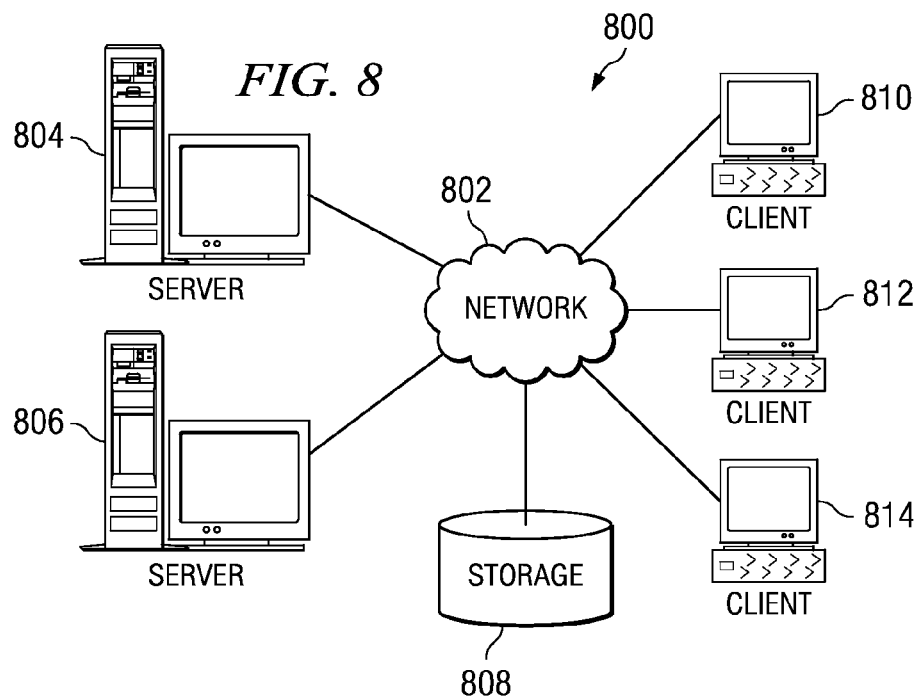

CONSOLIDATED LAUNCHING OF MULTIPLE TASKS

This application is a continuation of application Ser. No. 11/450,618 filed Jun. 9, 2006 status abandoned.

BACKGROUND OF THE INVENTION

1. Field of the Invention

The invention disclosed and claimed herein generally pertains to a method whereby a multiplicity of tasks, each performed by launching a software or other component, are carried out in a pre-specified order or arrangement. More particularly, the application pertains to a method of the above type wherein the launching of one component to perform its task has a pre-specified relationship to the launching of other task components. Even more particularly, the invention pertains to a method of the above type wherein launch descriptions for respectively launching each of the individual components are consolidated, in order to provide a single composite launch description for launching the multiplicity of tasks.

2. Description of the Related Art

Integrated Development Environments (IDEs), such as an open source product known as Eclipse, are currently the tool of choice for complex software development. These environments support the full development life cycle by combining a rich set of cooperating tools, such as visual user-interface builders, source-code editors, compilers and debuggers. IDEs organize software into projects, where a project typically corresponds to a platform-specific software component such as a Web service or its corresponding client. However, while IDEs are very useful in developing individual components, they tend to fall short in developing heterogeneous systems consisting of multiple components, such as distributed applications. A distributed application contains sub-applications that can run on multiple computational nodes. Thus, there is a need to augment IDEs to effectively manage collections of projects or other software components as coherent entities.

An important aspect of the application development cycle is the ability to launch the developed application for the purposes of testing and debugging. Accordingly, when developing a distributed application having multiple sub-applications, it is important to have the capability of launching the different sub-applications simultaneously, or in some other pre-specified relationship with one another. Such relationships may be provided by specifying launch parameters, which indicate such things as which sub-applications to launch, in what order, on what computers, and under what conditions. Such a specification, also referred to as a launch configuration, usefully should be stored so that it can be applied repeatedly in the development process. Moreover, in order to support structured organization, it would be desirable to provide a launch configuration with a hierarchical structure. This would enable grouping of sub-applications and launch parameters.

In current IDEs, the notion of a launch configuration is generally well known. However, mechanisms for flexibly composing launch configurations as well as the notion of a hierarchically organized aggregated launch arrangement that encompasses multiple launchings, are generally not known. In the absence of an aggregated launcher, the application developer has to manually perform several launch operations each time that testing and debugging is carried out. This process tends to be cumbersome and error-prone. In addition, when performing certain tests such as stress testing, the developer may want to launch multiple instances of an application, such as one instance of a server and many instances of a client. Again, in current IDEs this needs to be done manually.

One prior art IDE product provides the ability to launch a distributed application (called a "solution") and thereby launches its constituent sub-application. However, such product has no capability of defining launch configurations independently of a solution, nor does it support hierarchical organization of the launch configuration. Such product only lists the sub-applications contained in the solution. Moreover, the parameters of an aggregated launch configuration are very restricted.

In IDEs that support Web tooling, such as Eclipse, there is only a limited notion of distributed launching. That is, when testing a Web application, the IDE launches both an application server and a browser client. However, while this feature may exemplify a "one click" way of launching multiple computational nodes, it is restricted to the Web-based client-server model, and has no notion of hierarchy or flexible composition.

In a traditional, non-IDE approach to development, scripts such as shell script are used for launching. This approach requires scripting expertise, and lacks the affordances of an IDE, such as a graphical interface. Furthermore, this approach does not provide a generic flexible method for composing launches.

From the above, it is seen that a flexible method for composing launch configurations is required for advancing the state of the art in modern distributed application development. In particular, providing such a method in an IDE, which also supports hierarchical composition, is particularly valuable. While this will be useful for distributed application development, it is anticipated that such a method would have other useful applications as well, such as in stress testing.

SUMMARY OF THE INVENTION

The invention provides a general purpose mechanism for consolidating the launching of multiple tasks. A task is said to be launched, when it or an associated software component is run or executed. In one embodiment of the invention, launch descriptions of the individual tasks are read and parsed. Composition parameters are then read, wherein the parameters indicate relationships between the launchings of different tasks, such as launch order, specific timings and synchronizations, delays between tasks, and groupings of tasks. A combined or composite launch description is then constructed, wherein the composite description takes into account both the individual launch descriptions and the composition parameters. Finally, tasks of the composite launch description are launched. For example, if the tasks are software components, they are run in a certain order or arrangement, each with its own parameters. In a further embodiment, directed to a method of the above type, a plurality of individual launch descriptions are delivered to a tool, wherein each of the individual launch descriptions is usable to launch a corresponding component to perform a corresponding task. The method further comprises providing the tool with a set of launch relationships, wherein a given launch relationship specifies the relationships between launchings of two or more components. The tool is then operated to generate a single composite launch description that defines the launching of the components in accordance with the set of launch relationships.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a flow chart depicting steps for an embodiment of the invention.

FIG. 2 is a schematic diagram illustrating usage of a single or individual launch description.

FIG. 3 is a schematic diagram illustrating use of a tool in implementing an embodiment of the invention.

FIG. 8 is a block diagram showing a distributed data processing system in which an embodiment of the invention may be used.

FIG. 9 is a block diagram showing a data processing or computer system for implementing an embodiment of the invention.

DETAILED DESCRIPTION OF THE PREFERRED EMBODIMENT

Figure 4:
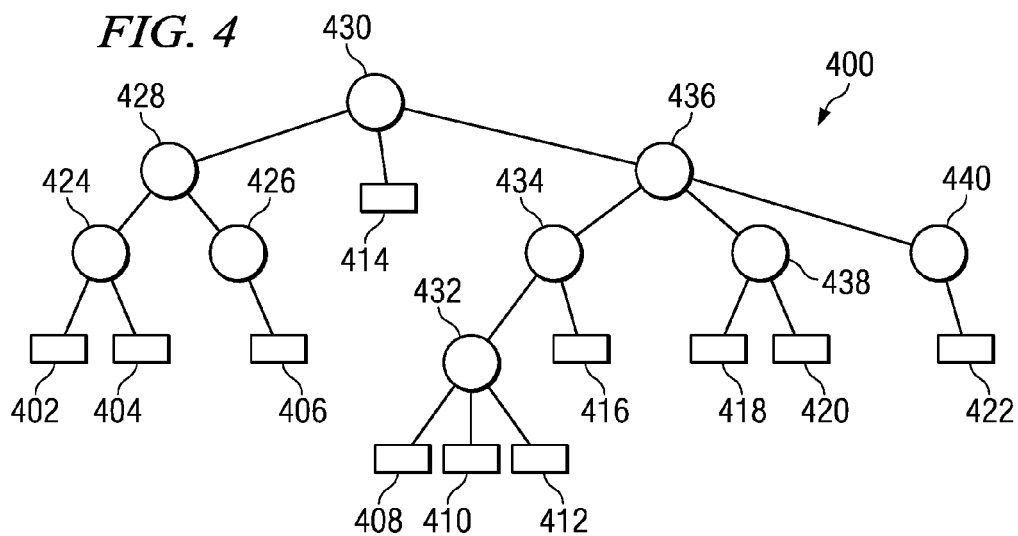
FIG. 4 is a schematic diagram illustrating a hierarchical tree structure for a composite launch configuration in an embodiment of the invention.

Referring to FIG. 1, there is shown a flow chart showing principal steps of a method comprising an embodiment of the invention. The method discloses a general purpose mechanism for consolidating the launching of multiple tasks. A task, or a software component for performing the task, is "launched", as such term is used herein, when it is run or executed. For example, a software component is launched when it is run or debugged. A physical task is launched when it is executed.

FIG. 1 shows that a first step 102 of the method is to read the launch description of each individual task of the multiplicity of tasks. These descriptions need to be in a prescribed format, e.g. XML with a particular schema, so that they can be parsed. The result of step 102 is that a list of input launch descriptions is stored in a selected data structure. The use of an individual launch description is described hereinafter in further detail, in connection with FIG. 2.

At step 104, the method reads a set of composition launch parameters that have been supplied. These parameters generally relate to how the launches are composed. Parameters may indicate the relationship between the launching of a component, to perform its corresponding task, and the launching of one or more other components. For example, a launch parameter could specify an order or sequence in which different components and their tasks are to be launched, with respect to one another. Another parameter could specify the timing or delay between tasks that are launched successively, or could specify that tasks are to be launched simultaneously or in some other timed or synchronized relationship. Launch parameters could also indicate the number of instances for a launched component, or specify the conditions under which the task would or would not be launched. Further parameters could group tasks into different subsets, or could indicate the computers or other locations for launching respective tasks.

From the individual launch descriptions and the composition launch parameters, a representation of the composite or combined launch description is constructed, as shown by step 106. The composite launch description, or composite launch configuration, mirrors the nested structure of a composite entity, such as an application having multiple sub-applications. A launch of the composite launch description, shown at step 108, acts by delegation. That is, the composite launch is equivalent to the launch of respective constituents that are contained in the composite entity, wherein each constituent has its own specified launch configuration. Respective individual constituent launchings occur in accordance with the order, sequence, or other launch relationships that are specified by the composition launch parameters. If the tasks are software components, they are run in a certain order (or in parallel), each with its own parameters. In the case of physical tasks, they may be executed in a particular, prescribed manner, by a person or group of people.

FIG. 2 is a schematic diagram illustrating an individual launch description 202 that is associated with a software component 204. A launch description interpreter 206 is provided to interpret launch description 202, and to thus run software component 204 on the appropriate run time environment 208. For example, for a software component such as a Web application or Java application, the launch description would comprise a group of parameters and other related pieces of information. Collectively, these would provide enough information, when presented to launch description interpreter 206, to launch the software component. In an IDE, a small document or the like is provided to be the launch description 202, in order to launch software component 204 to perform a desired task. The IDE is also provided with a software component comprising the launch description interpreter 206, which responds to the information provided by the launch description to trigger the launch of software component 204.

Referring to FIG. 3, there is shown a tool 302 for implementing an embodiment of the invention. Tool 302 may, for example, comprise a software based tool that is part of an IDE. FIG. 3 shows multiple individual launch descriptions 304 delivered as inputs to tool 302. As described above, each individual launch description is usable to launch a corresponding component, and to thereby perform a corresponding task. FIG. 3 further shows tool 302 being provided with composition launch parameters 306, as described above in connection with FIG. 1. The tool 302 is then operated to construct a single composite launch description 308 from these inputs, as likewise described above in connection with FIG. 1. The composite launch description defines the launching of respective software components and their tasks, in accordance with a set of launch relationships specified by composition launch parameters 306.

Referring to FIG. 4, there is shown a composite launch description comprising a composite launch configuration 400. The configuration 400 could be useful, for example, for consolidated launching of a collection of projects in an IDE. More particularly, the composite launch configuration 400 comprises a collection of projects arranged for launching in a hierarchical tree structure. The leaves 402-422 comprise projects or other components that are to be launched, and internal nodes 424-440 represent hierarchical collections, groupings or subsets of projects. Thus, leaves 408-412 comprise a project subset under node 432, and leaves 402-404 comprise a subset under node 424. Arranging related leaf projects in a subset under a common node can be very useful for certain purposes. For example, all the projects under node 432 could be launched at the same time, or could be launched using the same computer. The hierarchical arrangement is also useful for enabling an application developer to visualize the composite launch configuration, or to select a particular project subset for launch and testing. The developer can also rearrange project launches in the overall configuration, and can specify the launch order of sub-projects within the composite project, to enable various test scenarios.

Figure 5:
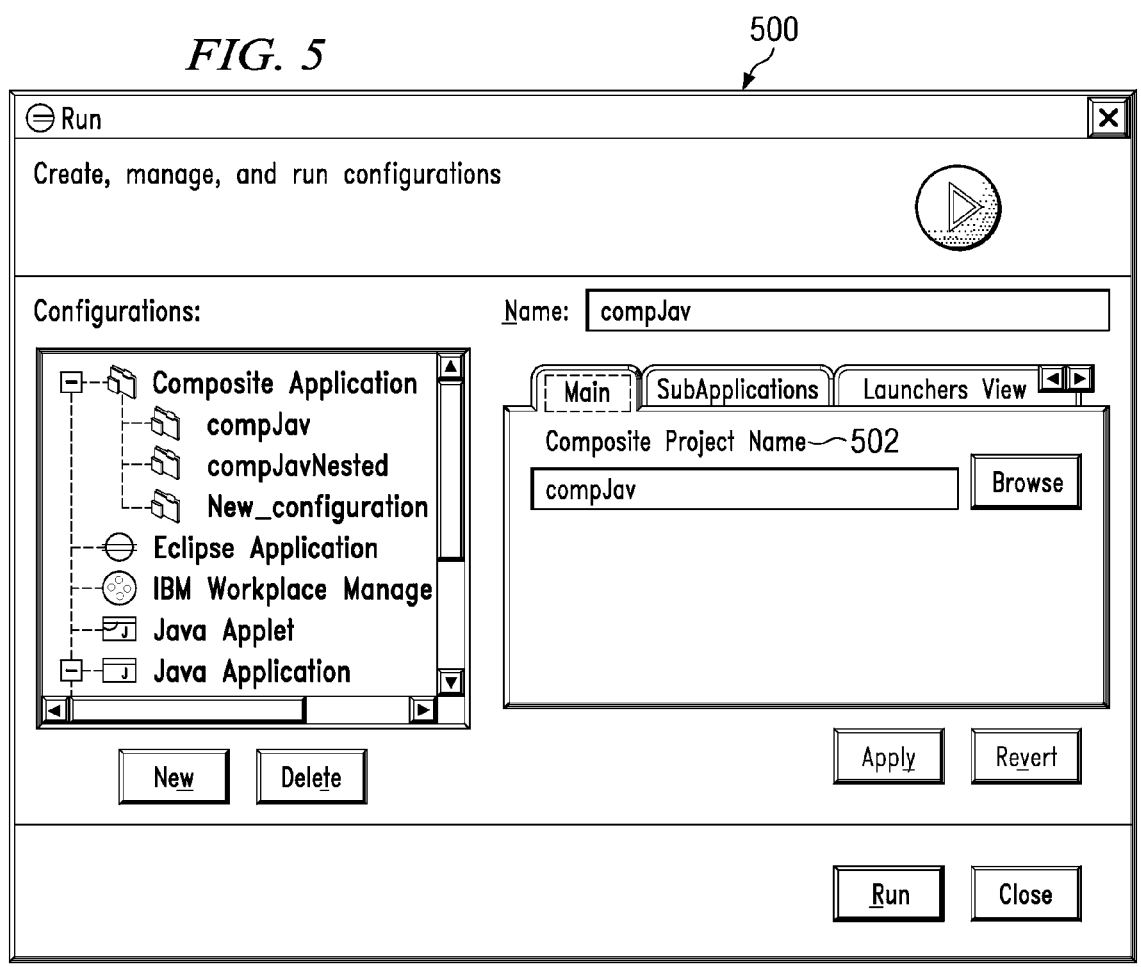
FIGS. 5, 6 and 7 respectively show screen shots pertaining to an embodiment of the invention.
Figure 6:
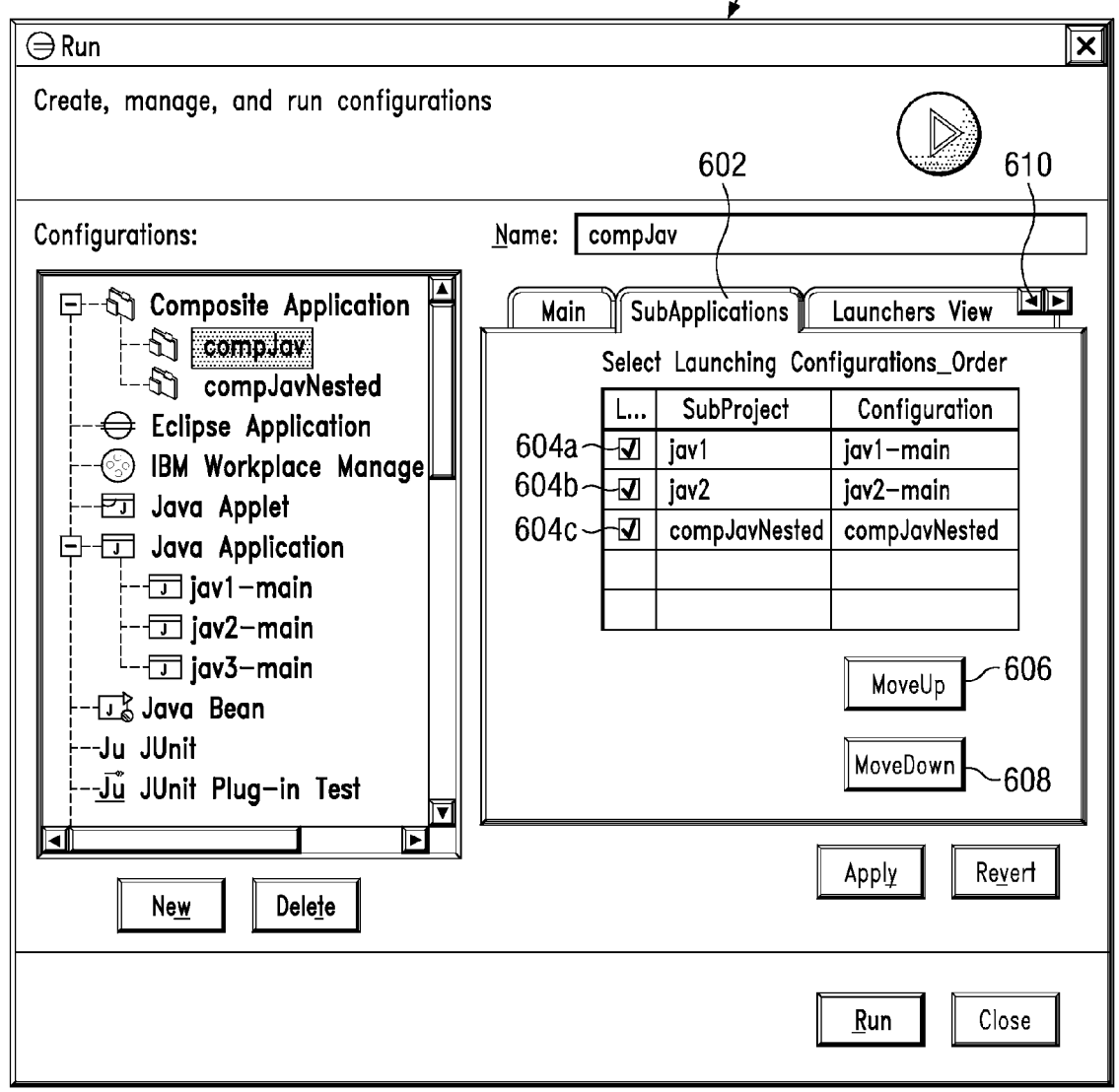
Figure 7:
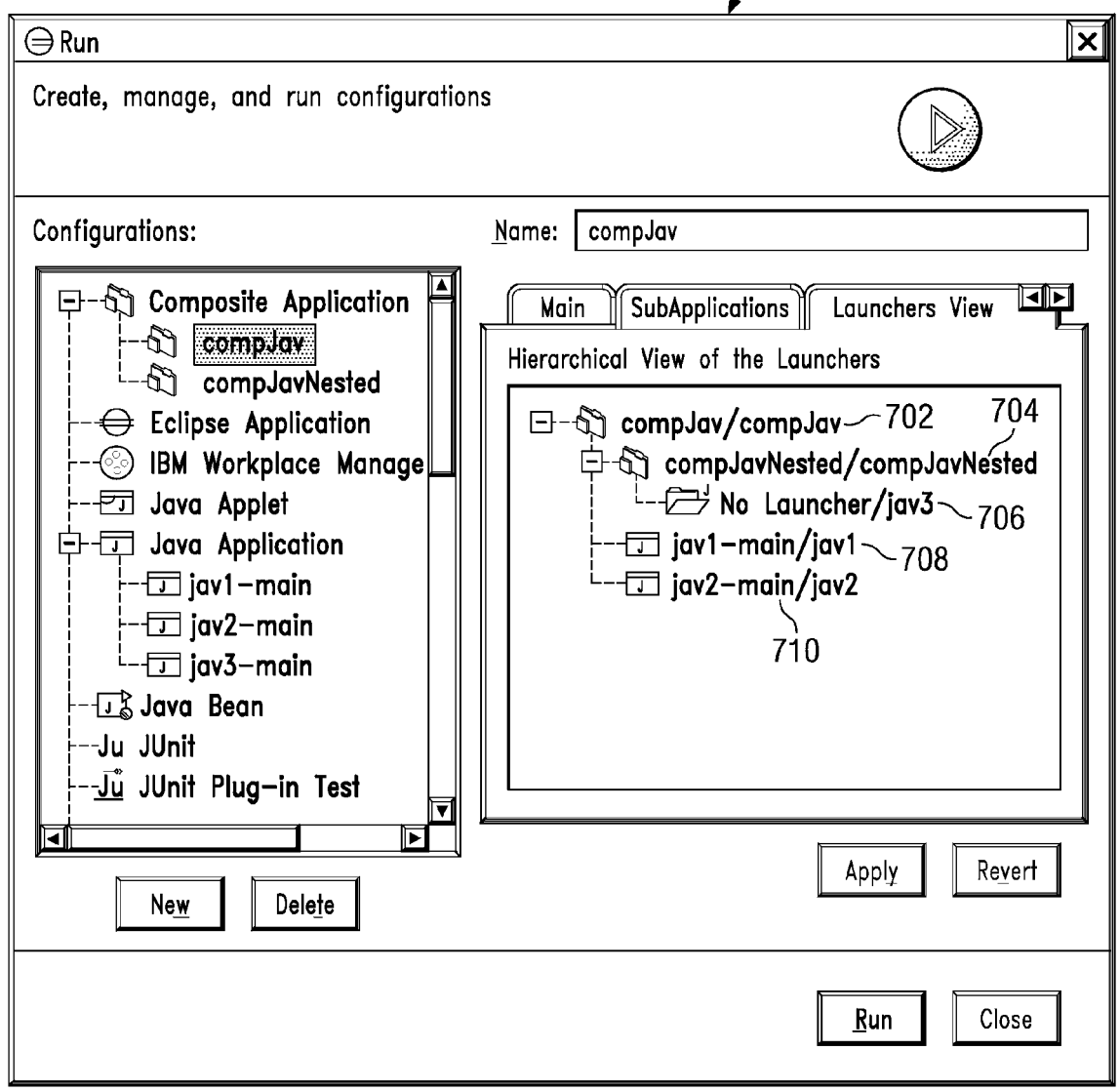

FIGS. 5-7 respectively show screen shots of a user interface (UI) 500, wherein UI 500 may be interconnected with tool 302 described above. UI 500 is provided to enable a developer or other user to visualize, manipulate or selectively modify a composite project launch configuration generated by tool 302.

Referring to the screen depicted in FIG. 5, there is shown a window 502 labeled Composite Project Name. This window is used to select or specify the name of a composite project. In FIG. 5, the name "compJav" has been selected.

FIG. 6 shows multiple tabs employed for defining the launch configuration. The "SubApplications" tab 602 (shown in the center) lists the sub-projects that are to be launched by using checked boxes 604a-c, in order to indicate whether a sub-project should be launched in the next run. The "MoveUp" button 606 and "MoveDown" button 608 enable a user to readily change the launch order. The functionality of this tab can easily be extended to define additional launch parameters such as the number of instances to launch. The "Launchers View" tab 610 (shown on the right) shows the entire hierarchy of the launch configuration as depicted in FIG. 7. In the example shown in FIG. 6, "jav1" and "jav2" are sub-applications inside CompJav, and "compJavNested" is an internal node.

FIG. 7 shows a screen shot that visually presents a tree structure as described above in connection with FIG. 4. For example, the top level 702 of the tree, "compJav/compJav", has a child 704 (compJavNested), which has a child 706 (NoLauncher/jav3). Top level 702 also has further children 708 and 710.

Referring to FIG. 8, there is shown a generalized distributed data processing system 800 comprising a network of computers. System 800 may be used in connection with distributed applications and their development, and may thus be used with embodiments of the invention. Distributed data processing system 800 contains a network 802, which is the medium used to provide communications links between various devices and computers connected together within distributed data processing system 800. Network 802 may include permanent connections, such as wire or fiber optic cables, or temporary connections made through telephone connections, as well as wireless connections such as Wi-Fi (802.11) and Bluetooth.

In the depicted example, a server 804 and server 806 are connected to network 802 along with storage unit 808. In addition, clients 810, 812, and 814 are connected to network 802. These clients 810, 812, and 814 may be, for example, personal computers, network computers or mobile computers such as PDAs and smart phones. For purposes of this application, a network computer is any computer, coupled to a network, which receives a program or other application from another computer coupled to the network. In the depicted example, server 804 provides data, such as boot files, operating system images, and applications to clients 810-814.

Clients 810, 812, and 814 are clients to server 804. Additionally, clients 810-814 may be clients to server 806 in these examples. Moreover, tool 302 shown in FIG. 3, together with other computer hardware and software components required to implement embodiments of the invention, may reside in or collectively comprise one of the clients 810-814.

Distributed data processing system 800 may include additional servers, clients, and other devices not shown. In the depicted example, network 802 interconnecting system 800 could be the Internet. Distributed data processing system 800 also may be implemented as a number of different types of networks, such as, for example, an intranet, a local area network (LAN), or a wide area network (WAN).

Referring to FIG. 9, there is shown a block diagram of a generalized data processing system 900 which may be adapted for use as one of the client computers 810-814 shown in FIG. 8. Data processing system 900 exemplifies a computer, in which code or instructions for implementing embodiments of the invention may be located. Data processing system 900 usefully employs a peripheral component interconnect (PCI) local bus architecture, although other bus architectures such as Accelerated Graphics Port (AGP) and Industry Standard Architecture (ISA) may alternatively be used. FIG. 9 shows a processor 902 and main memory 904 connected to a PCI local bus 906 through a Host/PCI bridge 908. PCI bridge 908 also may include an integrated memory controller and cache memory for processor 902. It is thus seen that data processing system 900 is provided with components that may readily be adapted to provide tool 302 as described above, together with other components for implementing embodiments of the invention as described herein.

Referring further to FIG. 9, there is shown a local area network (LAN) adapter 912, a small computer system interface (SCSI) host bus adapter 910, and an expansion bus interface 914 respectively connected to PCI local bus 906 by direct component connection. Audio adapter 916, a graphics adapter 918, and audio/video adapter 922 are connected to PCI local bus 906 by means of add-in boards inserted into expansion slots. SCSI host bus adapter 910 provides a connection for hard disk drive 920, and also for CD-ROM drive 924.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a USB flash drive, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, Ethernet cards and wireless adapters are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for consolidated launching of a plurality of tasks, the method comprising:
    delivering, by a computer, a plurality of individual launch descriptions associated with the plurality of tasks as input to a tool that is included in an integrated development environment, wherein each individual launch description in the plurality of launch descriptions is used to launch a corresponding component within a plurality of components that performs a corresponding task in the plurality of tasks;
    providing, by the computer, the tool with a set of launch relationships, wherein a given launch relationship specifies a relationship between launchings of two or more of the plurality of components;
    operating, by the computer, the tool to generate a composite launch description that defines the launching of the plurality of components in based on each individual launch description in the plurality of launch descriptions and the set of launch relationships, wherein the composite launch description comprises a composite launch configuration in a hierarchical tree structure that consolidates launching of a collection of projects in the integrated development environment;
    launching, by the computer, the plurality of components in a pre-specified order according to the composite launch description; and
    halting, by the computer, a launch of a specified number of the plurality of components.

2. The method of claim 1, wherein a launched component comprises a software component that performs its corresponding task.

3. The method of claim 1, wherein the plurality of components and their corresponding tasks comprise leaves in the hierarchical tree structure, and wherein internal nodes in the hierarchical tree structure represent hierarchical groups of the plurality of components and their corresponding tasks.

4. The method of claim 3, wherein the set of launch relationships comprises composition launch parameters that apply both to the internal nodes and to the leaves in the hierarchical tree structure.

5. The method of claim 1, wherein the set of launch relationships comprises one or more composition launch parameters.

6. The method of claim 5, wherein the one or more composition launch parameters are selected from a group of parameters that includes an order in which respective components in the plurality of components are launched, timing delays in launching of respective components, a number of instances for launching a given component, required conditions for launching a given component, and a location for launching a given component.

7. The method of claim 1, wherein the composite launch description is retained.

8. The method of claim 1, wherein the hierarchical tree structure is viewable via a graphical user interface to select and launch a particular project subset within the collection of projects in the integrated development environment.

9. The method of claim 1, wherein the plurality of components are launched to perform a debugging operation on a specified system.

10. A computer program product stored on a computer readable storage device having instructions embodied thereon that are executable by a computer for consolidated launching of a plurality of tasks, the computer program product comprising:
    instructions for delivering a plurality of individual launch descriptions associated with the plurality of tasks as input to a tool that is included in an integrated development environment, wherein each individual launch description is used to launch a corresponding component within a plurality of components that performs a corresponding task in the plurality of tasks;
    instructions for providing the tool with a set of launch relationships, wherein a given launch relationship specifies a relationship between launchings of two or more of the plurality of components;
    instructions for operating the tool to generate a composite launch description that defines the launching of the plurality of components based on each individual launch description in the plurality of launch descriptions and the set of launch relationships, wherein the composite launch description comprises a composite launch configuration in a hierarchical tree structure that consolidates launching of a collection of projects in the integrated development environment;
    instructions for launching the plurality of components in a pre-specified order according to the composite launch description; and
    instructions for halting a launch of a specified number of the plurality of components.

11. The computer program product of claim 10, wherein the plurality of components and their corresponding tasks comprise leaves in the hierarchical tree structure, and wherein internal nodes in the hierarchical tree structure represent hierarchical groups of the plurality of components and their corresponding tasks.

12. The computer program product of claim 10, wherein the set of launch relationships comprises one or more composition launch parameters, and wherein the one or more launch parameters are selected from a group of parameters that includes an order in which respective components in the plurality of components are launched, timing delays in launching of respective components, a number of instances for launching a given component, required conditions for launching a given component, and a location for launching a given component.

13. The computer program product of claim 10, wherein the hierarchical tree structure is viewable via a graphical user interface to select and launch a particular project subset within the collection of projects in the integrated development environment.

14. The computer program product of claim 10, wherein the plurality of components are launched to perform a debugging operation on a specified system.

15. A computer system for consolidated launching of a plurality of tasks, the computer system comprising:

a bus system;
a storage device coupled to the bus system, wherein the storage device stores instructions; and
a processor coupled to the bus system, wherein the processor executes the instructions to:
  deliver a plurality of individual launch descriptions associated with the plurality of tasks as input to a tool that is included in an integrated development environment, wherein each individual launch description is used to launch a corresponding component within a plurality of components that performs a corresponding task in the plurality of tasks;
  provide the tool with a set of launch relationships, wherein a given launch relationship specifies a relationship between launchings of two or more of the plurality of components;
  operate the tool to generate a composite launch description that defines the launching of at least some of said the plurality of components based on each individual launch description in the plurality of launch descriptions and the set of launch relationships, wherein the composite launch description comprises a composite launch configuration in a hierarchical tree structure that consolidates launching of a collection of projects in the integrated development environment;
  launch the plurality of components in a pre-specified order according to the composite launch description; and
  halt a launch of a specified number of the plurality of components.

16. The computer system of claim 15, wherein the plurality of components and their corresponding tasks comprise leaves in the hierarchical tree structure, and wherein internal nodes in the hierarchical tree structure represent hierarchical groups of the plurality of components and their corresponding tasks.

17. The computer system of claim 15, wherein the hierarchical tree structure is viewable via a graphical user interface to select and launch a particular project subset within the collection of projects in the integrated development environment.

* * * * *